United States Patent Office 3,277,038
Patented Oct. 4, 1966

3,277,038
ASPHALT COMPOSITIONS CONTAINING A DRY MIX OF VIRGIN BUTYL RUBBER OR POLYISOBUTYLENE AND CARBON BLACK
Paul R. Wood, Naugatuck, Conn., assignor to United States Rubber Company, New York, N.Y., a corporation of New Jersey
No Drawing. Filed Nov. 7, 1960, Ser. No. 67,517
3 Claims. (Cl. 260—28.5)

This application is a continuation-in-part of application Serial No. 65,555 filed July 21, 1960, which is a continuation-in-part of application Serial No. 680,948 filed August 29, 1957, both now abandoned.

This invention relates to asphalt compositions containing polyisobutylene or isobutylene-isoprene copolymer synthetic rubber.

It has been suggested to incorporate Vistanex (which is the conventional name for polyisobutylene) and Butyl rubber (which is the conventional name for isobutylene-isoprene copolymer synthetic rubber) in asphalt which is used in road surfacing, e.g. as the binder for the aggregate in paving constructions, and for roofing and other uses, generally in amount from 1 to 20 parts per 100 parts of the asphalt. One purpose of adding such polymers to asphalt is to increase the viscosity and elasticity of the asphalt. Such asphalt and polymer compositions are melted before use and oftentimes are kept in hot storage for considerable periods of time. A disadvantage is that the suspended particles of polymer (Vistanex or Butyl rubber) become swollen and float to the top of the asphalt blend on non-agitated hot storage. In many cases the agitation required to prevent this separation is very impractical for large storage tanks. In some cases the Vistanex or Butyl rubber layer at the surface becomes so firm that it is impractical to redisperse it. Also, I have found that whereas incorporating in the asphalt polyisobutylene or isobutylene-diolefine copolymer synthetic rubber having a Staudinger molecular weight of at least 40,000 advantageously increases the viscosity of the asphalt, it markedly impairs physical properties, such as impact strength at ambient and low temperatures.

According to the present invention, the Vistanex or Butyl rubber is uniformly dispersed in the asphalt as very fine particles and remains dispersed and does not float out on hot storage. Also the impact strength at ambient and low temperatures is greatly increased, showing improved ductility and flexure—fatigue resistance.

In carrying out the present invention, the virgin polymer viz. Vistanex or Butyl rubber, is mixed with carbon black and the dry mixture is then blended with the asphalt. By virgin polymers is meant raw polymer, i.e. not vulcanized or reclaimed polymer. Reclaimed polymers which contain carbon black added before reclaiming and vulcanized Butyl rubber which contains carbon black do not give the improvements of the present invention. The Staudinger molecular weight of the polyisobutylene or isobutylene-isoprene copolymer should be at least 40,000 and may be as high as 1,500,000. Commercial Butyl rubbers which are copolymers of 95 to 99.5 parts of isobutylene and correspondingly 5 to 0.5 parts of isoprene have Staudinger molecular weights of 40,000 and above, and may be used in the present invention. Commercial polyisobutylenes (Vistanex) are available in Staudinger molecular weights of 40,000 and above and may also be used in the present invention. Low molecular weight polyisobutylenes having Staudinger molecular weights up to 15,000 are also available but these have a high degree of cold flow and do not appreciably increase the viscosity of the asphalt as shown in Example 1 below and are of no value in the present invention.

The carbon black is mixed with the virgin Vistanex or Butyl rubber in the proportion of 0.1 to 2 parts carbon black per part of Vistanex or Butyl rubber. The amount of Vistanex or Butyl rubber in the asphalt blend will be 1 to 20 parts per 100 parts of the asphalt. The carbon black may be mixed with the Vistanex or Butyl rubber in the conventional manner as on a rubber mill or in a Banbury mixer. Such previously prepared dry mixture of virgin polymer and carbon black may be blended with the asphalt by comminuting the polymer-carbon black mixture and adding it to molten asphalt heated to 250° F. to 350° F. in a heated storage tank equipped with stirrers and pumps as in the conventional practice of blending polymers with asphalt. The polymer and carbon black mixture may also be blended with the asphalt by gradually adding molten asphalt at a temperature of 250° F. to 350° F. to the mixture of Vistanex or Butyl rubber and carbon black in an internal mixer of the Werner and Pfleiderer type and then removing the blend and bulk heating for 2 to 4 hours at 250° F. to 350° F. This latter method was used in preparing the blends in the examples below.

The virgin Vistanex or Butyl rubber polymer which is mixed with the carbon black according to the present invention is uniformly dispersed in the asphalt in the form of fine particles, whereas the virgin polymer itself without carbon black, and the vulcanized and reclaimed polymers containing carbon black, become suspended in the asphalt in the form of large particles. On hot storage, the virgin Vistanex or Butyl rubber polymer, when mixed with carbon black according to the present invention, does not separate from the asphalt but remains finely dispersed therein. On the other hand the virgin polymer alone, and vulcanized and reclaimed polymers containing carbon black, float on top of the asphalt or sink to the bottom of the asphalt on hot storage.

A 110–120 penetration asphalt was used throughout the work referred to herein. Asphalt binders are graded according to penetration values at 77° F. as measured by the Standard Method of Test for Penetration of Bituminous Materials (A.S.T.M. D5–52), the penetration values being measured as the tenths of a millimeter that a tapered standard needle (0.14 to 0.16 mm. tip diameter) will penetrate the asphalt at 77° F. in five seconds with a 100 gram load. Penetration values for asphalt binders range from 40 to 300. The lower penetration grades being used for hot climates and the higher penetration grades being used for cold climates. Any asphalt in this penetration range of 40 to 300 may be used in the present invention. A 110–120 penetration asphalt was used in all the examples and is a type that may be used in temperate climates. Changes in viscosity of the asphalt on addition of polymers may be followed by changes in the penetration value, decreases in the penetration value indicating increases in the viscosity.

The following examples are illustrative of the present invention. Two commercial grades of polyisobutylene were used and these will be designated "Vistanex A" and "Vistanex B". Vistanex A had a Staudinger molecular weight in the range 46,000–64,000. Vistanex B had a Staudinger molecular weight of over 300,000. Two commercial grades of isobutylene-isoprene copolymer were also used and these will be designated "Butyl A" and "Butyl B". Butyl A had a Staudinger molecular weight in the range 46,000–64,000. Butyl B had a Staudinger molecular weight in the range 64,000–100,000. All parts and percentages referred to herein are by weight.

*Example 1*

This example shows the great increase in viscosity of asphalt (decrease in penetration value) with the incorporation of Vistanex and Butyl rubbers having Staudinger molecular weights of at least 40,000 as compared with only very minor and relatively insignificant increase in viscosity of asphalt with the incorporation of commercial low molecular weight Vistanex (Vistanex LM–MS and Vistanex LM–MH) which are outside the scope of the present invention. The penetration values at 77° F. of the plain asphalt and the asphalt to which 5% of the various polymers had been added to the molten asphalt is shown in the following table:

Polymer added: Penetration value
    None (plain asphalt) _____ 112
    Butyl A (mol. wt. 46,000–64,000) _____ 76
    Butyl B (mol. wt. 64,000–100,000) _____ 71
    Vistanex A (mol. wt. 46,000–64,000) _____ 74
    Vistanex B (mol. wt. over 300,000) _____ 67
    Vistanex LM–MS (mol. wt. 10,000–11,500) __ 98
    Vistanex LM–MH (mol. wt. 11,500–13,000) __ 95

Interpreting the above penetration values, a drop from 112 for the straight asphalt to 95–98 for the low molecular weight Vistanex represents only a very minor increase in viscosity, whereas a drop from 112 to 67–76 for the higher molecular weight Vistanex and Butyl rubber represents a great increase in viscosity. Only higher molecular weight polyisobutylenes and isobutylene-isoprene copolymer rubbers, e.g. those having a molecular weight of at least 40,000, appreciably increase the viscosity and elasticity of the asphalt and are of value in the present invention.

The following examples illustrate the increase in impact strength on mixing the virgin polymer with the carbon black before blending with the asphalt according to the present invention. Impact strengths were measured at 0° C., 10° C., and 15° C. Impact strengths were measured by dropping steel balls of varying weights from 2 grams to 225 grams (23 different weight balls) from a height of 20 inches onto a 3 inch diameter disk one-eighth inch thick of the asphalt or asphalt blend with its circumference resting on the rim of a three-fourths inch high steel ring. The largest ball the sample under test could withstand without impact failure was recorded as the impact strength. An impact strength of "225" means that the sample did not fracture when tested with the largest 225 gram test ball, and it was not determined how heavy a test ball the sample could withstand. The weight of the largest ball before failure of the sample is the figure used in the tables below under the heading "Impact Strength".

*Example 2*

Impact strength tests were run on the plain asphalt, and on the asphalt blended with 5% of its weight of virgin Vistanex A, Vistanex B, Butyl A, and Butyl B as in prior practice. Results are shown in the following table:

| Composition | Impact Strength | | |
|---|---|---|---|
| | 0° C. | 10° C. | 15° C. |
| Plain Asphalt (Control) | 12 | 40 | 49 |
| Asphalt+Vistanex A | 8 | 12 | 19 |
| Asphalt+Vistanex B | 4 | 8 | 6 |
| Asphalt+Butyl A | 8 | 12 | 36 |
| Asphalt+Butyl B | 6 | 12 | 32 |

In all cases the Vistanex and Butyl rubber alone reduced the impact strength of the asphalt.

*Example 3*

Impact strength tests were run on the asphalt blended with 5% of its weight of virgin Vistanex A, Vistanex B, Butyl A, and Butyl B, the Vistanex and Butyl in each case being previously mixed with an equal weight of MPC carbon black (medium process channel black), in accordance with the present invention. Results are shown in the following table:

| Addition to Asphalt | Impact Strength | | |
|---|---|---|---|
| | 0° C. | 10° C. | 15° C. |
| 5% Vistanex A+Carbon Black | 28 | 112 | 225 |
| 5% Vistanex B+Carbon Black | 25 | 95 | 225 |
| 5% Butyl A+Carbon Black | 28 | 112 | 225 |
| 5% Butyl B+Carbon Black | 28 | 130 | 225 |

The mixing of the carbon black with the Vistanex and Butyl before blending with the asphalt greatly increased the impact strength over the plain asphalt or the blends of asphalt and the Vistanex or Butyl rubbers alone as shown in Example 2.

*Example 4*

Impact strength tests were run on the asphalt blended with 5% of its weight of virgin Butyl B which had previously been mixed with MPC carbon black in various ratios with results shown in the following table:

| Ratio of Carbon Black to Butyl B | Impact Strength | | |
|---|---|---|---|
| | 0° C. | 10° C. | 15° C. |
| 0.33:1 | 22 | 49 | 225 |
| 0.6:1 | 28 | 55 | 225 |
| 0.72:1 | 28 | 95 | 225 |
| 0.84:1 | 28 | 112 | 225 |
| 1.0:1 | 28 | 130 | 225 |
| 1.32:1 | 32 | 130 | 225 |

The various ratios of carbon black to Butyl rubber all gave greatly increased impact strengths, over the plain asphalt or the blend of asphalt and the Butyl rubber alone as shown in Example 2.

*Example 5*

Impact strength tests were run on the asphalt blended with 5% of its weight of virgin Butyl B which had previously been mixed with an equal weight of different furnace and channel carbon blacks with results shown in the following table:

| Kind of Carbon Black | Impact Strength | | |
|---|---|---|---|
| | 0° C. | 10° C. | 15° C. |
| FEF (Fast Extruding Furnace) | 16 | 49 | 225 |
| HAF (High Abrasion Furnace) | 22 | 61 | 225 |
| SAF (Superior Abrasion Furnace) | 28 | 112 | 225 |
| HMF (High Modulus Furnace) | 16 | 49 | 225 |
| EPC (Easy Processing Channel) | 16 | 49 | 225 |
| MPC (Medium Processing Channel) | 28 | 130 | 225 |

The different carbon blacks mixed with the Butyl rubber before blending with the asphalt gave increased impact strengths over the plain asphalt or the blend of asphalt and the Butyl rubber alone as shown in Example 2.

*Example 6*

That the carbon black alone added to the asphalt will not increase the impact strength is shown in the following table of results where different amounts of MPC carbon black alone were mixed with the asphalt in the absence of the Vistanex or Butyl rubber.

| Percent Carbon Black Added (Based on Asphalt) | Impact Tests | | |
|---|---|---|---|
| | 0° C. | 10° C. | 15° C. |
| 0 | 12 | 40 | 49 |
| 5 | 12 | 19 | 45 |
| 10 | 12 | 19 | 45 |

Example 7

That a blend of asphalt and virgin polymer previously mixed with carbon black gives a much greater impact strength than a blend of the asphalt with the same amount of polymer and carbon black in the form of reclaim or ground vulcanized Butyl rubber scrap is shown in this example: Impact strength tests were run on plain asphalt; on the asphalt blended with 5% of its weight of Butyl rubber in the form of a reclaimed Butyl rubber; on the asphalt blended with 5% of its weight of ground vulcanized Butyl rubber scrap (26 mesh); and on the asphalt blended with 5% of its weight of virgin Butyl rubber which had previously been mixed with the same ratio of carbon black as in the reclaim. Results are shown in the table below:

| Composition | Impact Strength | | |
|---|---|---|---|
| | 0° C. | 10° C. | 15° C. |
| Plain Asphalt | 12-16 | 41-45 | 49-55 |
| Asphalt + reclaimed Butyl | 12-16 | 36-40 | 80-95 |
| Asphalt + ground Butyl rubber scrap | 8 | 25 | 32 |
| Asphalt + virgin Butyl + carbon black | 32-36 | 130-225 | 225 |

Example 8

That the virgin Vistanex or Butyl rubber and carbon black must be blended with the asphalt as a previously prepared dry mixture and not added to the hot asphalt as an aqueous dispersion or so-called latex of the polymer containing carbon black is shown in this example.

Aqueous dispersions of Vistanex A and Butyl A were prepared by dispersing 15% hexane solutions of these polymers in water using a conventional emulsifying and dispersing agent. The hexane was then removed from the resulting dispersions by stream distillation. The dispersions were then heat concentrated to 25% solids content. Polyisobutylene polymers and isobutylene-isoprene copolymers are made at very low temperatures and not in aqueous emulsions so that a latex is not a product of their manufacture but the above method is a well known manner of making so-called artificial latices from the solid polymers. A dispersion of carbon black in water containing conventional dispersing agent was mixed with the above dispersions of Vistanex A and Butyl A in the ratio of carbon black to polymer of 0.84:1. The dispersions of Vistanex A and carbon black, and of Butyl A and carbon black, were slowly added to hot asphalt (325° F.). After all the water was removed, the resulting blends which contained 5% polymer based on the asphalt were stirred and maintained at 325° F. for four hours. The Vistanex A and Butyl A in both blends separated to the surface of the asphalt. Impact strength tests were run on the blends with results shown in the following table:

| Addition to Asphalt as Dispersion | Impact Strength | | |
|---|---|---|---|
| | 0° C. | 10° C. | 15° C. |
| Vistanex A + carbon black | 8 | 12 | 19 |
| Butyl A + carbon black | 8 | 12 | 36 |

The above results are the same as those obtained for the asphalt blended with the straight Vistanex A and Butyl A without carbon black as shown in Example 2 above. The results clearly show that adding Vistanex or Butyl rubber as aqueous dispersions containing dispersed carbon black to asphalt does not give the increase in impact strength that is obtained when a previously prepared dry mixture of the polymer and carbon black is blended with the asphalt as illustrated in Example 3 above.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition consisting essentially of asphalt having incorporated therein a previously prepared dry mixture of carbon black and virgin polymer selected from the group consisting of polyisobutylene having a Staudinger molecular weight of at least 40,000 and isobutylene-isoprene copolymer synthetic rubber having a Staudinger molecular weight of at least 40,000, said polymer being in amount from 1 to 20 parts per 100 parts of said asphalt, and said carbon black being in amount from 0.1 to 2 parts per part of said polymer.

2. A composition consisting essentially of an asphalt having a penetration value in the range from 40 to 300 having incorporated therein a previously prepared dry mixture of virgin polyisobutylene having a Staudinger molecular weight of at least 40,000 and carbon black, said polyisobutylene being in amount from 1 to 20 parts per 100 parts of said asphalt and said carbon black being in amount from 0.1 to 2 parts per part of said polyisobutylene.

3. A composition consisting essentially of an asphalt having a penetration value in the range from 40 to 300 having incorporated therein a previously prepared dry mixture of virgin isobutylene-isoprene copolymer rubber having a Staudinger molecular weight of at least 40,000 and carbon black, said isobutylene-isoprene coplymer rubber being in amount from 1 to 20 parts per 100 parts of said asphalt and said carbon black being in amount from 0.1 to 2 parts per part of said isobutylene-isoprene.

References Cited by the Examiner

UNITED STATES PATENTS

| 2,537,190 | 1/1951 | Lankau et al. | |
|---|---|---|---|
| 2,772,903 | 12/1956 | Sussenbach. | |
| 2,822,342 | 2/1958 | Ford et al. | 262—41.5 |
| 2,830,963 | 4/1958 | Traxler et al. | |
| 2,952,650 | 9/1960 | Wood. | |
| 3,042,635 | 7/1962 | Wood. | |

MORRIS LIEBMAN, *Primary Examiner.*

ALPHONSO D. SULLIVAN, *Examiner.*

J. ZIEGLER, D. C. KOLASCH, J. A. GAZEWOOD,
*Assistant Examiners.*